United States Patent [19]

Schlichtig

[11] Patent Number: 4,506,524
[45] Date of Patent: Mar. 26, 1985

[54] ABSORPTION TYPE HEAT TRANSFER SYSTEM FUNCTIONING AS A TEMPERATURE PRESSURE POTENTIAL AMPLIFIER

[76] Inventor: Ralph C. Schlichtig, 11212 3rd Ave. South, Seattle, Wash. 98168

[21] Appl. No.: 523,185

[22] Filed: Aug. 15, 1983

[51] Int. Cl.³ .............................................. F25B 15/00
[52] U.S. Cl. .......................................... 62/476; 62/112
[58] Field of Search .................................. 62/112, 476

[56] References Cited

U.S. PATENT DOCUMENTS 3,490,739  1/1970  Buckman et al. .................. 62/112 X

OTHER PUBLICATIONS

Hainsworth, W. R., "Refrigerants & Absorbents, " Parts I & II, Refrigerating Engineering, vol. 48, Aug. 1944, (No. 2), Sep. 1944, pp. 204-205.
"Kinetic" Lab Report, *Absorption Isoterms for Freon Compounds* 5 Pages, Mar. 12, 1956.

*Primary Examiner*—Lloyd L. King
*Attorney, Agent, or Firm*—Kenneth W. Thomas

[57] ABSTRACT

An absorption type heat transfer and thermally powered temperature pressure potential amplifier system for storing energy by distilling and separating solute from a solution of the solute and a solvent at a low temperature, then amplifying and recovering the temperature and/or vapor pressure potential difference between the solute and the solution at a higher temperature in the form of heat transfer or its mechanical power equivalent. One working fluid is a solute having a low boiling point, the other a solution of the solute in a solvent having a high boiling point such that mutual solubility is poor at low temperatures as indicated by a small vapor pressure difference between solute and solution, and in which the vapor pressure difference between solute and solution greatly increases at higher temperatures. This permits the vapor pressure potential difference to be released in the form of mechanical work when vapor from separated solute is reabsorbed into solution in an absorber at the higher temperature. Similarly, an amplified temperature difference exists between liquid solute and absorbent solution in a high temperature absorber when solute vapor passes freely into solution within the absorber. The working fluids are circulated in a closed cycle with an intermediate counter-flow heat exchange means for exchanging heat between separated solute and solution moving from the colder distilling means, and recombined warm solution returning to the colder distilling and separating means from the higher temperature absorber. This system utilizes low grade heat from natural sources.

26 Claims, 6 Drawing Figures

ABSORPTION TYPE HEAT TRANSFER SYSTEM FUNCTIONING AS A TEMPERATURE PRESSURE POTENTIAL AMPLIFIER

BACKGROUND OF INVENTION

This invention relates to a thermally powered absorption system and the needed working fluids, comprising a low boiling point solute and a high boiling point solvent, for producing useful heat transfer or its power equivalent.

Absorption type air conditioning and refrigeration systems of the prior art have some aspects in common with this invention; but the fluid pairs for working fluids and the systems chosen for prior art absorption type air conditioning and refrigeration cycles do not exhibit temperature pressure potential amplification as illustrated in FIG. 1. Also, prior art absorption cycles employ heat flow at the high temperature region to power the cycle rather than heat flow at the low temperature region to power the cycle of the system. For instance, see U.S. Pat. No. 4,009,575.

SUMMARY OF THE INVENTION

As expected in thermally powered systems, there is in this system a low temperature region and a high temperature region, with working fluids involved in a thermodynamic cycle between the low temperature region and the high temperature region. In this system solute vapor is absorbed in a high temperature absorber from which heat of absorption is released. More specifically, at the low temperature region of the cycle, solute vapor is removed by evaporation from a solution of solute and a solvent within a low temperature separator means, and such solute vapor that is separated is condensed to a liquid in a low temperature condenser means to thus establish a temperature and/or vapor pressure potential difference between the condensed solute and the remaining concentrated solution in the separator. By vapor pressure potential difference is meant vapor pressure difference between vapor in equilibrium with the two fluids times the specific volume of the vapor. Thus heat flow in the low temperature region can provide power which can be delivered at the high temperature region.

It is desirable for the mutual solubility of the working fluids, solute and solvent, to be so limited at the low temperature region that the resulting solution has a vapor pressure approaching that of the separated solute; then as the temperature of the working fluids increases, the vapor pressure of the solution must increase less rapidly than the vapor pressure of the separated solute and Raoult's law is approached. In other words, the mutual solubility of the solute and solvent is greater at high temperatures than at low temperatures as indicated by the slope of the curve, plotted for the vapor pressure of the solution on a logarithm scale versus temperature, being less steep than the corresponding slope of the curve plotting vapor pressure versus temperature for the pure solvent. (See FIG. 1). The percent solution in all examples means weight percent of low boiling point solute in solution. The working fluids thus chosen permit separation of solute from solution by distillation by using a small amount of energy or a small temperature difference between the separator and the condenser at low temperatures. At high temperatures the vapor pressure of the separated solute is so increased over that of the remaining concentrated solution that there is an amplified pressure potential difference that can be recovered when the vaporized solute is reabsorbed into solution. In practice, means is provided such as a counter-flow heat exchanger to raise the temperature of the separated solute and remaining concentrated solution, thus amplifying the temperature and/or vapor pressure potential difference between the condensed solute and the concentrated solution. The counter-flow heat exchanger also provides means for cooling diluted solution returning to the low temperature region.

The separated liquid solute is delivered to a boiler means where evaporation takes place, and a delivery means delivers the resulting solute vapor to a higher temperature absorber with associated heat exchange means which receives the heated concentrated solution, all of which provides means for recovering the amplified temperature and/or pressure potential difference to accomplish useful output in the form of heat transfer or its mechanical equivalent. The amplified pressure potential difference of the vaporized solute with respect to the vapor pressure potential of the solution within an absorber can either drive a power converter, such as a turbine or a positive displacer as illustrated, or it can be used more directly for heat transfer such as a distillation process for separating useful distillates, or the corresponding amplified temperature difference of the solute and solution can be used as a heat pump for space heating or for air conditioning.

In the case of refrigerant and absorbent solutions tested such as in Tables 1, 2, and 3 the heat of vaporization of the refrigerant at the higher temperature is so near the value of the heat of absorption of the vapor into solution that most useful free energy recovered as power must be replaced into the high temperature boiler in the form of make up heat from an external source. External heat may also be applied to the counter-flow heat exchanger, in which case the temperature of the external heat source fluid may be drawn down to near ambient temperature. In other cases when the heat of absorption is greater than the heat of vaporization of the solute, net heat absorbed at the low temperature separator may be recovered at the absorber for power conversion at the high temperature.

Therefore an object of this invention is to use heat transfer between two different temperatures in a low temperature region to produce heat transfer with amplified temperature difference in a high temperature region. Also an object of this invention is to generate power effeciently from heat of a geothermal or other hot water source.

Another object of this invention is to store temperature and/or pressure potential energy from a mechanical source at a low temperature, then to amplify the temperature and/or pressure potential energy by heating the working fluids, after which the amplified temperature pressure potential energy is converted back to mechanical energy.

Another object of this invention is to accomplish efficient transfer of heat for refrigeration or air conditioning.

Another object of this invention is to store temperature pressure potential energy by separating solute vapor from solution by mechanical means while mechanically maintaining a low temperature for the separation, then to amplify the temperature pressure potential energy by raising the temperature of the separated fluids, thus amplifying the temperature pressure potential energy to then be used for heat pumping for space heating, for air conditioning or other useful heat transfers.

Another object of this invention is to provide working fluids for a suitable absorption type thermal transfer system in which the working fluids include a low boiling point solute and a solvent of much higher boiling point such that the solubility of the solute in the solvent increases rapidly with the temperature rise of the resulting solution.

Other objects of this invention will become apparent from the following description when taken in conjunction with the accompanying drawings.

BRIEF DESCRIPTION OF THE DRAWINGS

FIG. 1 illustrates the required but typical difference in slope between the data curve of the pressure of pure refrigerant solutes and the vapor pressure data curves for the class of solutions disclosed as working fluids in the following descriptions. Vapor pressures are plotted according to a logarithm vertical scale.

Figure 1:
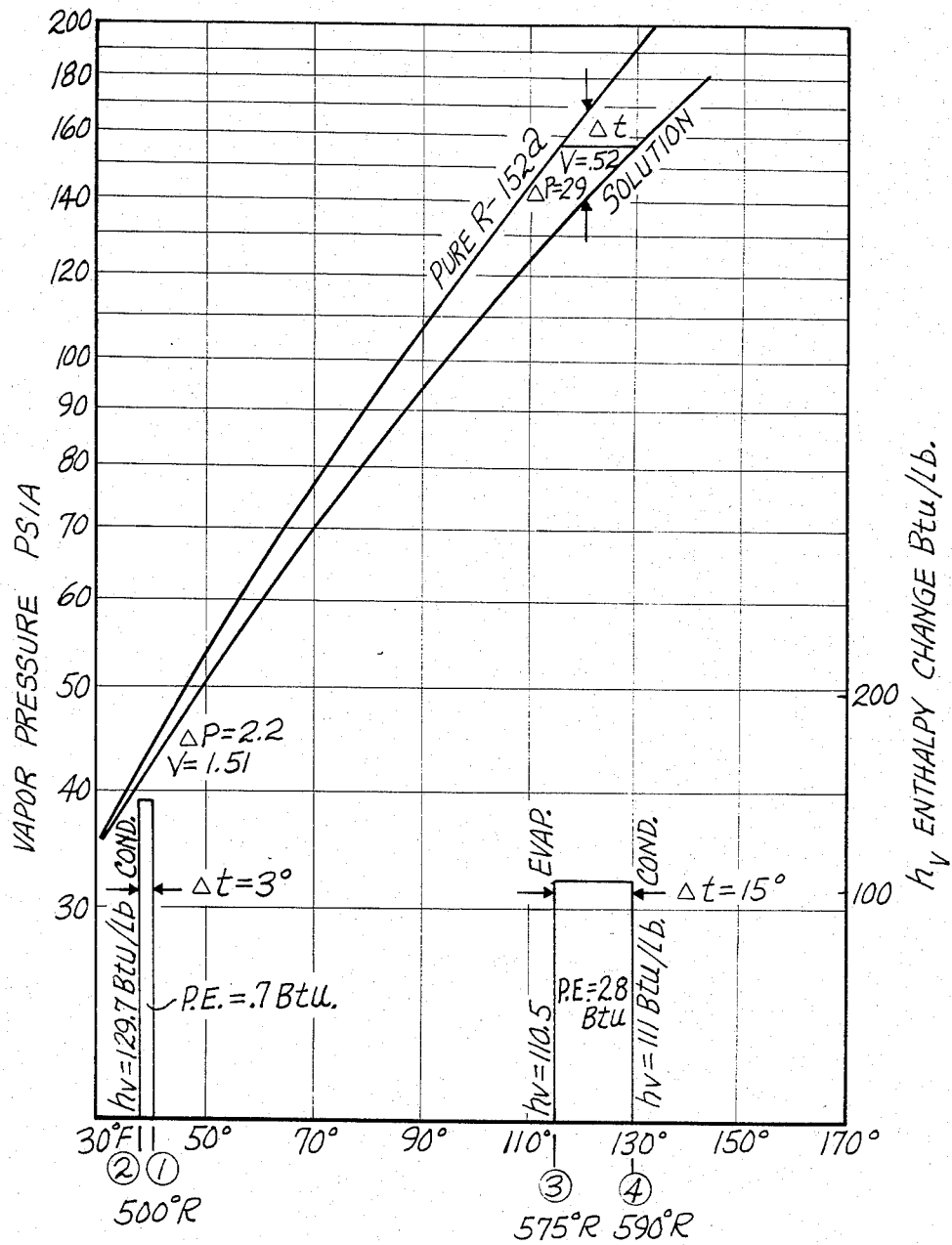
FIG. 1 shows the comparison between the vapor pressure data at various temperatures for a solution of 60% difluoroethane (R-152a) dissolved in the polar liquid n-propanol versus the data for vapor pressure for pure difluoroethane (R-152a). Percent numbers all mean weight percent.

The two rectangles in the lower portion of FIG. 1 are engine indicator diagrams by which one can calculate available mechanical energy for one pound of vaporized solute moving from the pure liquid phase to the solution phase. The first engine indicator diagram is for calculating the available pressure potential energy (Btu) at the indicated low temperature; the second engine indicator diagram is for calculating the amplified pressure potential energy for one pound of solute vapor at the higher temperature region.

In each of the following FIGS. 2 through 6 the low temperature region of the illustrated system is shown at the top, and the high temperature region is shown below.

Figure 2:
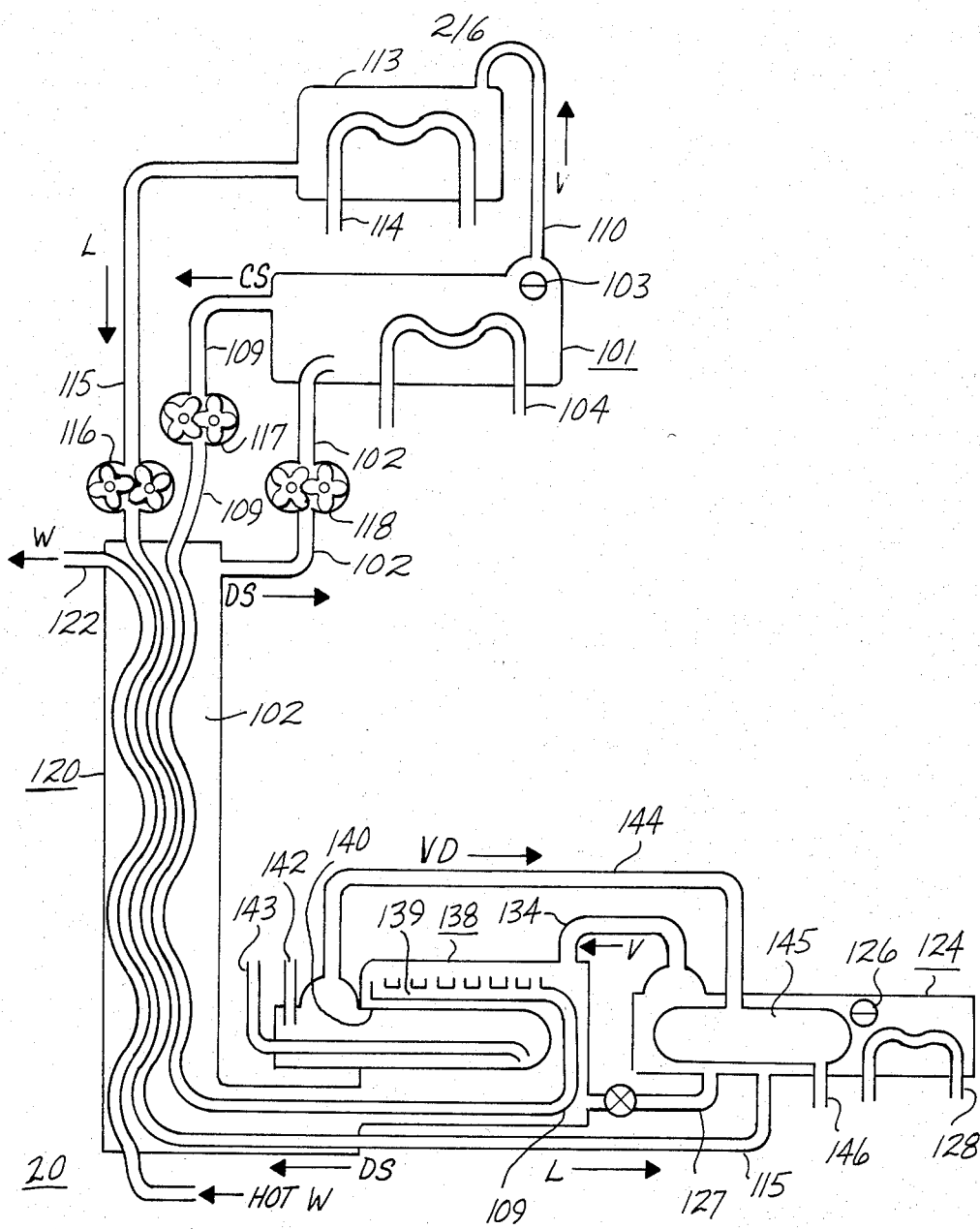

FIG. 2 shows an embodiment of this invention with the working fluids in a system in which the combined flow of heat from a low temperature source to a solute separator and then from a lower temperature condenser in a low temperature region to a lower temperature sink accomplishes separation of solute for solution to thus provide thermal power from heat transfer for accomplishing useful distillation in a relatively high temperature region.

Figure 3:
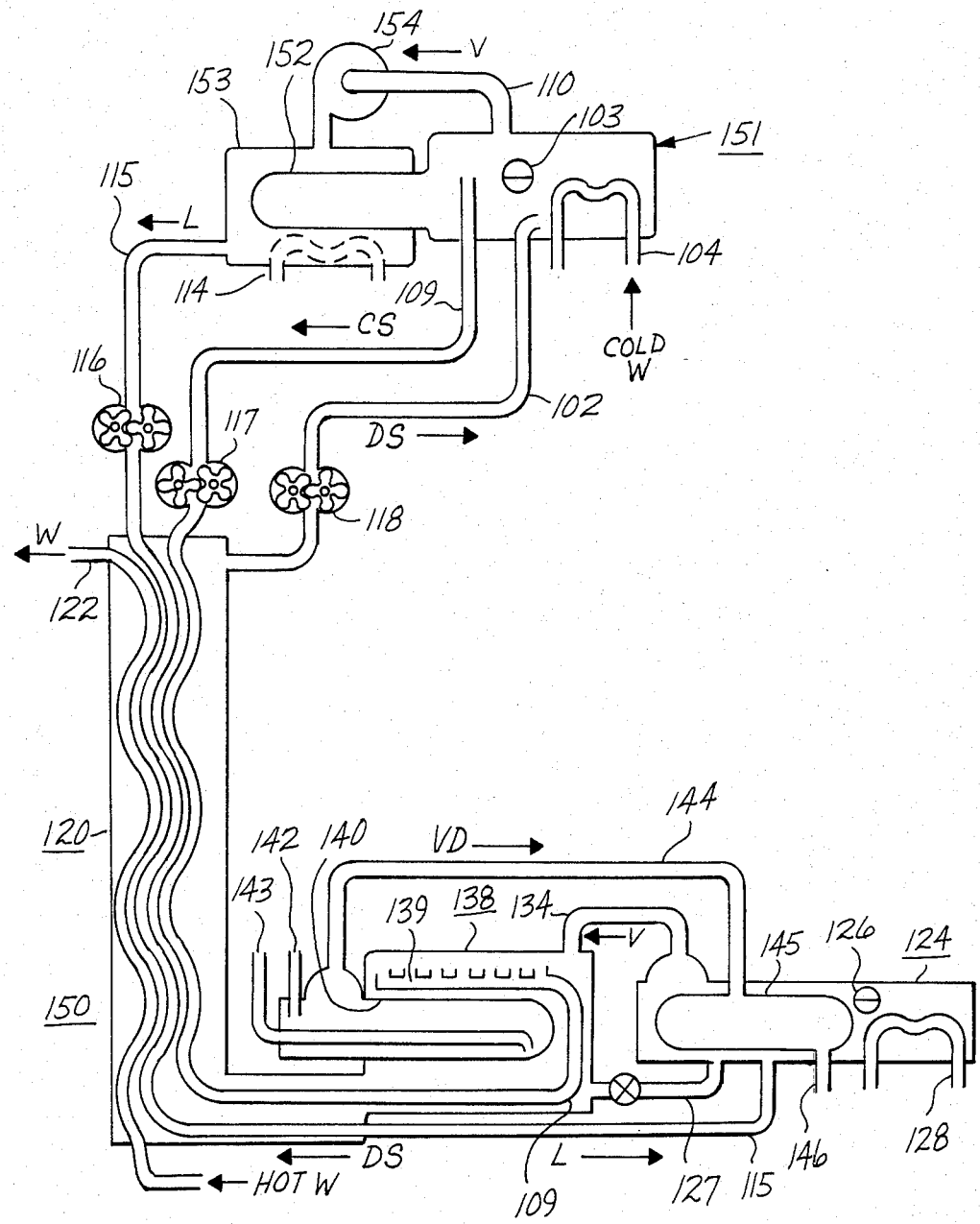

FIG. 3 shows another embodiment of this invention with the working fluids in a system similar to that of FIG. 2 in which useful distillation is accomplished at a relatively high temperature region. However, separation of vaporized solute from solution within a separator means at the low temperature region of this system of FIG. 3 is powered from a driven blower.

Figure 4:
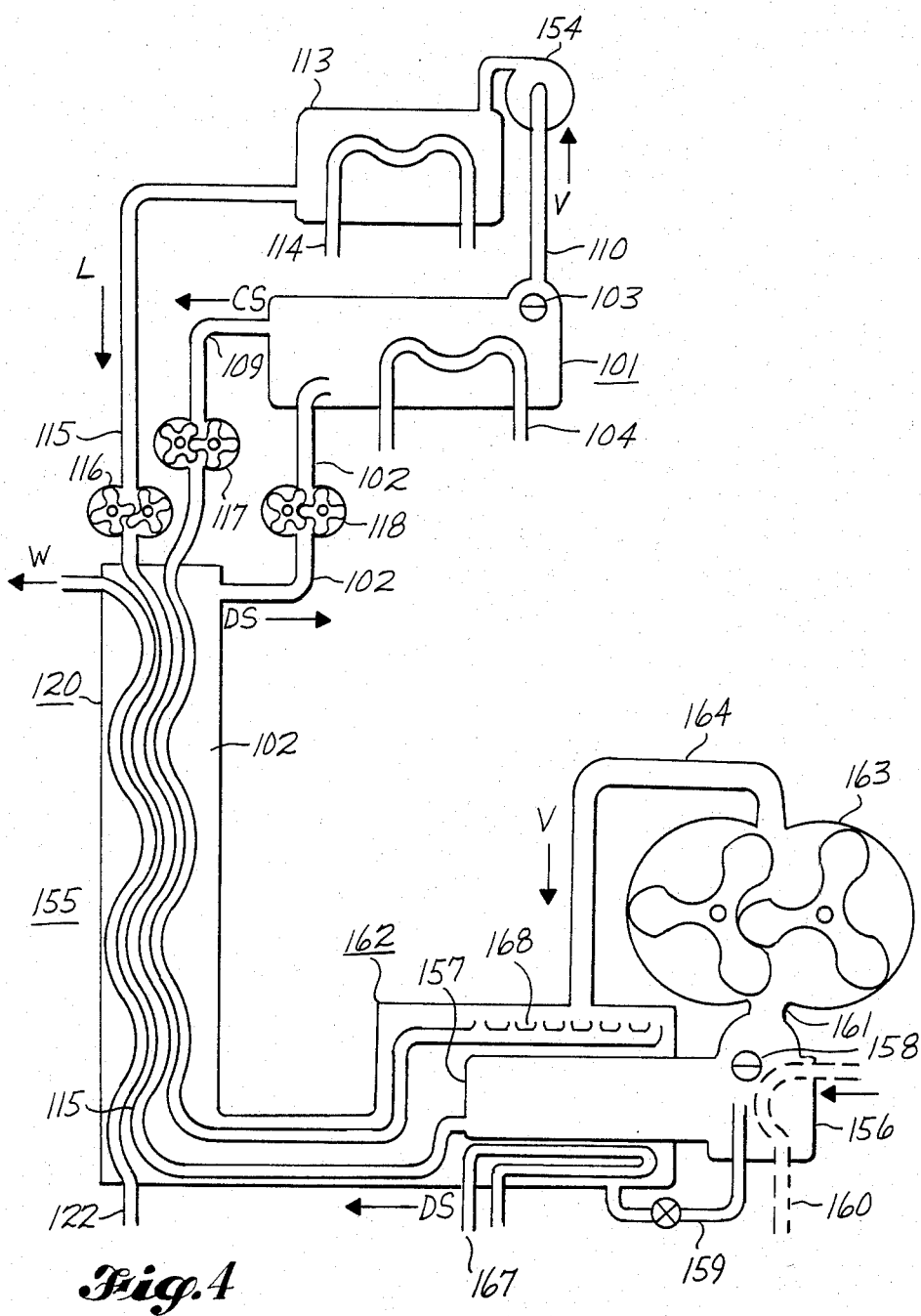

FIG. 4 shows another embodiment of this invention in which separation of solute from solution is caused by heat flow from a low temperature source to a solute separator and from a condenser to a lower tempreture heat sink with the assistance of a mechanically driven booster blower in the vapor conduit between the separator and the condenser, to thus store temperature and/or pressure potenetial energy. The separated solute and remaining solution from the separator are then heated by a counter-flow heat exchanger which receives make up heat from a relatively higher temperature external source to thus amplify vapor pressure potential difference. At the high temperature region amplified vapor pressure difference drives a power converter.

Figure 5:
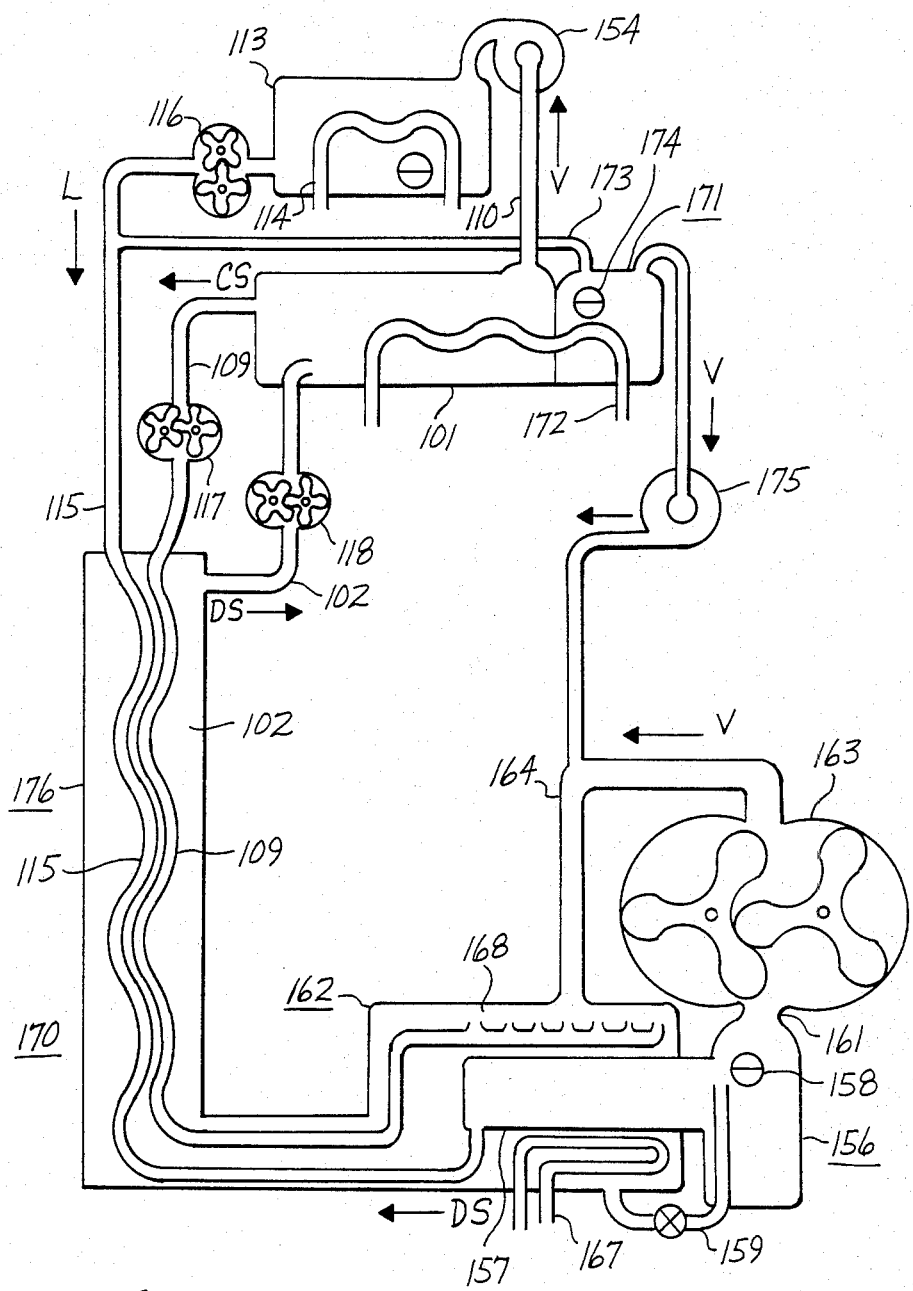

FIG. 5 shows another system which is an embodiment of this invention for deriving power by means of a power converter at a high temperature region similar to the system of FIG. 4, except that here a second booster blower acts as a heat pump to move heat from the low temperature region to the high temperature region to provide most of the make up heat to the high temperature region. Solute is separated from solution at the low temperature region as in the system of FIG. 4. A single heat exchanger is provided in the high temperature region by which heat can be exchanged with a high temperature external environment.

Figure 6:
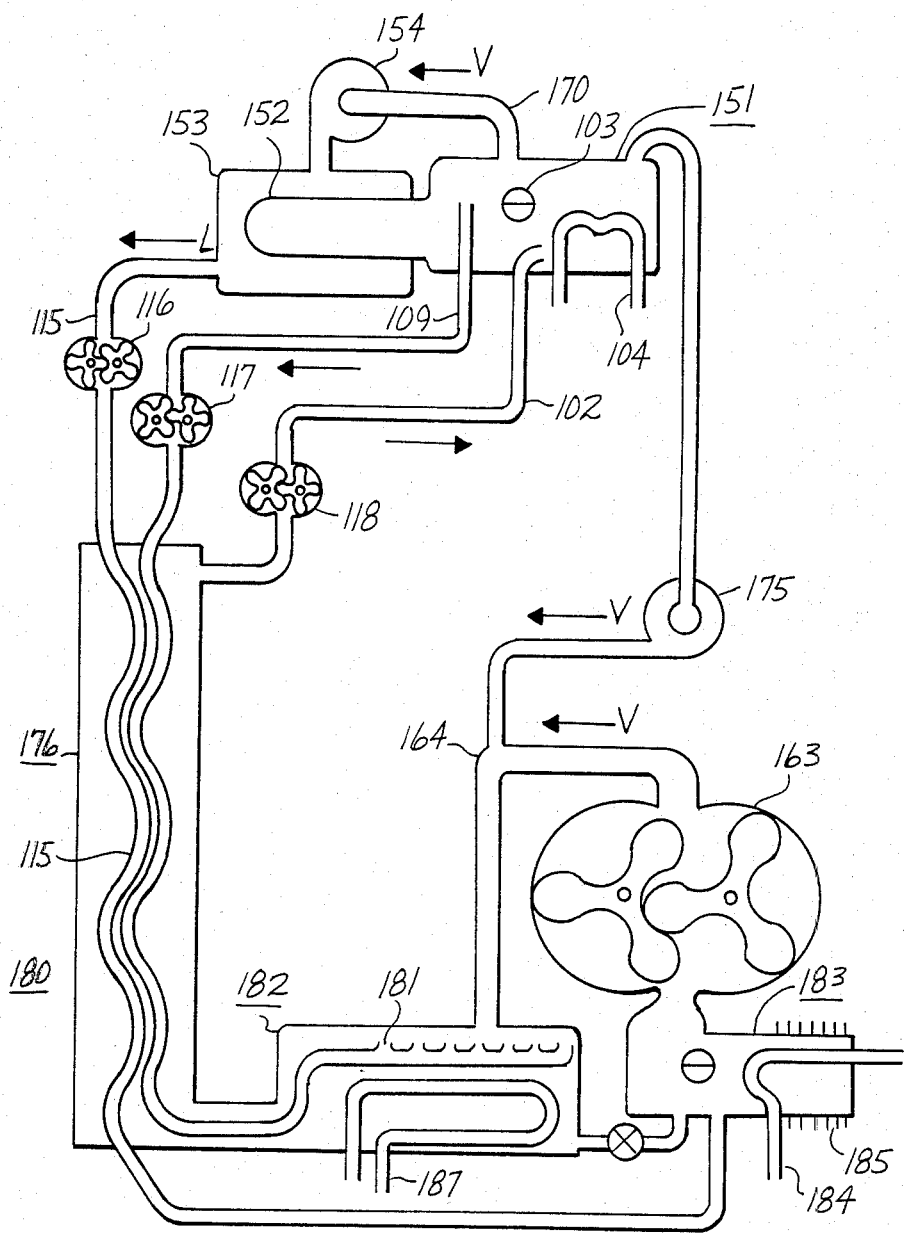

FIG. 6 shows an embodiment of this invention in which separation of refrigerant solute from solution for the purpose of storing pressure potential energy at the low temperature region is accomplished by a mechanically driven booster blower. Also a heat pump compressor is employed as in FIG. 5 to supply make up heat to the high temperature region, having a heat absorbing boiler and a higher temperature absorber, making the system useful for air conditioning. The positive displacement power converter such as the one illustrated can help move solute vapor to the higher temperature absorber where heat is rejected.

DESCRIPTION OF INVENTION

The operation of a temperature pressure potential amplifier system such as illustrated in FIG. 2 makes use of temperature difference between solute and solution arising from unusual vapor pressure versus temperature relations appearing in the illustrated family of binary liquids, one illustration of which is the refrigerant difluoroethane (R-152a) which serves as the low boiling point solute in a high boiling point solvent of n-propanol. This is one of the better examples, the data of which is tabulated in Table 1. Some of the data is plotted in FIG. 1. Also some measured values of vapor pressure versus temperature were also made with various concentrations of monochloro-difluoro-methane (R-22) in various alcohols, and of monochloro-difluoro-ethane (R-142b) and of dichloro-difluoro-methane (R-12) in the same alcohols. The refrigerants such as difluoroethane (R-152a) with lowest molecular weight and relatively non-polar seem to be the best solute. The solvent that seemed to give the best results was one of long chain molecules like n-propanol and even n-butanol in which the strong polar property is indicated by a large specific inductive capacity. In the case of n-propanol the specific inductive capacity at zero degree centigrade is 24.8 and at 20 degrees Centigrade the specific inductive capacity is 22.2. For amyl alcohol which is less satisfactory, the reported specific inductive capacity at zero degrees is but 17.4.

A few measured values of vapor pressure versus temperature of two useful concentrations of difluoroethane (R-152a) dissolved in n-propanol are compared with the corresponding vapor pressures of pure R-152a in Table 1. The normal boiling point of R-152a is −13 degrees F. while that of n-propanol is 207 degrees F. Heats of vaporization, h, measured in Btu per pound of vaporized R-152a from 68wt% solution were measured by means of an electric calorimeter. Heats of absorption have the same value, since the process is reversible. The specific volumes, v, in cubic feet per pound of vapor are shown in a few cases. Vapor pressures are designated in pounds per square inch (Psia).

Notice that at 40 degrees F. the vapor pressure of solution is greater than that of pure R-152a at only 35 degress F. temperature. On the other hand, the pressure of separated R-152a at 120 degrees F. appears greater than that of 68 wt. % solution, 20 degrees hotter.

This delta t of 5 degrees F. (40–35) at low temperature versus delta t of 20 degrees F. (140–120) at the high temperature region shows a temperature difference amplification of some four fold. Thus an absorber at a temperature above the temperature of the boiler can substitute for a colder condenser such as commonly found in Rankine engine cycles, and the absorber can heat the boiler.

TABLE 1

Refrigerant Difluoroethane in n-Propanol
Vapor Pressures in Pounds per Square Inch versus Temperature. The heat of vaporization $h_v$ of R-152a is 131.4 Btu/lb. at 30 Deg. F., 127.8 Btu at 50 Deg. F., 110.5 But at 115 Deg. F. and 100.9 Btu at 140 Deg. F.

| Temp. Deg. F. | R-152a Press. Psia | Spec. Vol. v cf/lb. | 55.5 wt % R-152a Press. Psia | Press. Potent. Energy | 68 wt % R-152a Press. |
|---|---|---|---|---|---|
| 25 | 33.71 | 2.189 | 33.0 | | |
| 30 | 37.23 | 1.991 | 35.2 | .7 Btu | |
| 35 | 41.05 | 1.815 | 38.6 | | 39.7 |
| 40 | 45.18 | | 41.6 | | 43.0 |
| 50 | 54.39 | 1.386 | 48.8 | 1.43 | 51.2 |
| 55 | 59.53 | 1.270 | 53.6 | | 55.8 |
| 65 | 70.92 | | 62.6 | | 64.9 |
| 70 | 77.21 | | 66.6 | | 70.6 |
| 80 | 91.10 | .837 | 77.0 | | 81.6 |
| 90 | 106.85 | .714 | 89.3 | | 94.6 |
| 100 | 124.6 | | 101.2 | | 106.6 |
| 105 | 134.28 | | 107.6 | | 114.6 |
| 110 | 144.52 | .524 | 114.6 | | 122.6 |
| 115 | 155.35 | | 122.6 | | 130.6 |
| 120 | 166.77 | .451 | 128.6 | 3.0 | 137.6 |
| 130 | 191.51 | | 146.6 | | 155.6 |
| 140 | 218.92 | .336 | 163.5 | 3.45 | 166.6 |

In the case of the above Table as well as some other useful pairs such as dichlorodifluoromethane (R-12) in n-butanol or n-propanol solvent, the solute molecules are relatively non-polar while the solvent molecules are highly polar chains. Tests also showed good values with the use of mixed alcohols such as n-propanol and n-butanol as solvent.

TABLE 2

Vapor Pressures of Refrigerant Difluoroethane (R-152a) in Mixed Alcohol Solvent Showing Temperature and/or Pressure Potential Amplification.

| Temp. Deg. F. | Vapor Press. R-152a Psia | Vap. Press 55 wt % R-152a Solvent mix 20% Glycol/ n-Butanol | Vap. Press. 55 wt % R-152a/ n-Butanol | Vap. Press. 50 wt % R-152a in solvent equal mix n-Propanol/ n-Butanol |
|---|---|---|---|---|
| 30 | 37.24 | 36.8 | 33.5 | 34.35 |
| 40 | 45.18 | 43.6 | 41.0 | 39.5 |
| 50 | 54.39 | 52.0 | 49.0 | 47.1 |
| 60 | 65.03 | 61.2 | 58.0 | 55.4 |
| 70 | 77.21 | 71.6 | 68.5 | 64.8 |
| 80 | 91.10 | 83.4 | 78.5 | 74.6 |
| 90 | 106.85 | 95.6 | 90.5 | 86.4 |
| 100 | 124.60 | 111.2 | 104.0 | 98.8 |
| 110 | 144.52 | 127.0 | 118.5 | 111.9 |
| 120 | 166.77 | 144.0 | 133.5 | 125.4 |
| 130 | 191.51 | 161.5 | 150.5 | 139.9 |
| 140 | 218.92 | 183.0 | 168.5 | 156.3 |

The free pressure potential energy, PE, of Table 1 is approximately the specific volume, v, of the solute vapor multiplied by the pressure difference between that of pure solute and of solution expressed in pounds per square foot. To convert to Btu units one must further divide by 778 ft. lbs./Btu. Thus in the case of one pound of R-152a separated from 55.5wt% solution at 30 Deg. F. the free pressure potential energy is calculated to be 0.70 Btu; whereas at a temperature of 120 Deg. F. the calculated free pressure potential energy is amplified to 3 Btu, and at 140 Deg. F. to 3.45 Btu.

FIG. 1 incorporates published and additionally measured data from Table 1 to illustrate the phenomenon of temperature and/or pressure potential amplification in the case of R-152a and its solution in n-propanol. How this phenomenon may be employed in various system embodiments to yield highly useful results will be explained separately in succeeding FIGS. 2 through 6. The vapor pressure of pure solute and of solution with various percentages of solute are plotted as sloping lines with a vertical logarythm scale against a horizontal scale of temperature in degrees F. In this case R-152a is plotted with its vapor pressure to represent the solute, and the vapor pressure of the solution is represented by 68 wt % R-152a (and 32 wt % n-propanol). This is but one example of several combinations the vapor pressures of which were measured. The observed divergence between the slope of the solution vapor pressure curve from the curve representing vapor pressure of pure solute plotted against temperature is a departure from Raoult's Law, which departure is the observed phenomenon making temperature and/or vapor potential pressure amplification a useful technology when employed in a suitable thermodynamic cycle in a mechanical system designed to operate within that cycle. A mixture of two refrigerants alone have at times been observed to exhibit this phenomenon of reduced slope of the vapor pressure versus temperature curve to a very limited extent to reduce compression ratio in the case of refrigeration. (See Dupont U.S. Pat. No. 3,394,878).

Table 3 is the vapor pressure data for monochlorodifluoro-methane (R-22) and for three concentrations of R-22 in alcohol solution. The 50% solution of R-22 in n-propanol is a very good concentration of solution for heat pumping. The more concentrated solutions are better if power is to be produced. Potential energies can be calculated in Btu per pound of solute by knowing the specific volume of the vapor. The vapor pressures of the pure R-22 and the corresponding specific volumes are published data. The vapor pressures are measured in pounds per square inch absolute.

Here the fluid vapor pressures for two concentrations of R-22 in n-propanol solution and another 66 percent concentration of R-22 in n-butanol are recorded to illustrate suitable fluids for two different manifestations of the energy output from a system such as that of FIG. 5. The first manifestation is that of a heat pump with a likely water supply at 50 Deg. F. in which weight percent R-22 in n-propanol is best. Vapor from this solution at 50 Deg. F. will condense at 24 Deg. F. or lower. Then the vapor from separated R-22 is at sufficient pressure at 50 Deg. F. that it can be absorbed in 50 wt% solution at 82 Deg. F. and liberate heat at that same temperature, thus fulfilling the requirement for an all absorption cycle heat pump. The heat of vaporization of R-22 at 82 Deg. F. is 77.46 Btu per pound, and at 120 Deg. F. heat of vaporization is 67.08 Btu per pound.

TABLE 3

Vapor Pressures Psia Versus Temperatures, (R-22) in n-propanol and n-butanol solution.

| Temp. Deg. F. | Press. Psia R-22 | Spec. Vol. v | Pressure 50 wt % R-22 solution propanol | Pressure 70 wt % R-22 solution propanol | Pressure 66 wt % R-22 solution n-butanol |
|---|---|---|---|---|---|
| 24 | 62.27 | .870 | 42.4 | 50.4 | |
| 34 | 74.8 | .799 | 50.4 | 59.3 | 67.0 |
| 40 | 83.20 | .657 | 54.6 | 65.3 | 73.5 |
| 50 | 98.73 | .556 | 62.6 | 76.25 | 86.0 |
| 60 | 116.3 | .4727 | 72.6 | 87.0 | 99.0 |
| 70 | 136.12 | .4037 | 82.6 | 100.1 | 113.5 |
| 74 | 144.71 | .3795 | 87.4 | 104.5 | 121.0 |
| 82 | 163.1 | .3359 | 96.8 | 116.8 | |
| 90 | 183.1 | .2979 | | 129.3 | 150.0 |
| 100 | 210.6 | .2570 | 121.6 | 146.5 | 170.5 |
| 120 | 274.6 | .1924 | 144.6 | 184.4 | 208.0 |

When a system such as illustrated in FIG. 5 is operated to deliver energy in the form of power at a higher temperature, a more concentrated solution such as 66 wt. percent monochloro-difluoromethane (R-22) in n-butanol is better to use, so the small temperature differential, 10 Deg. F., between a low temperature separator and a low temperature condenser is sufficient for operation when the separation takes place at 50 Deg. F. or lower.

TABLE 4

Vapor Pressure of 57 wt % R-142b (monochloro-difluoroethane) in n-propanol Compared With Published Vapor Pressures of Pure R-142b.

| Temp. Deg. F. | Specific Vol. v Vapor | Vapor Pressure Psia R-142b | Observed Pressure Psia 57 wt % R-142b n-propanol solution |
|---|---|---|---|
| 30 | 2.421 | 20.418 | 18.1 |
| 40 | 2.003 | 24.955 | 21.6 |
| 50 | 1.668 | 30.26 | 25.7 |
| 60 | 1.397 | 36.422 | 30.5 |
| 70 | 1.177 | 43.533 | 35.7 |
| 80 | .966 | 51.689 | 42.2 |
| 90 | .847 | 60.991 | 48.5 |
| 100 | .724 | 71.543 | 56.0 |
| 110 | .621 | 83.452 | 64.9 |
| 120 | .543 | 96.828 | 73.7 |
| 130 | .461 | 111.78 | 83.7 |
| 140 | .400 | 128.43 | 95.7 |

If it is desirable to deal with lower vapor pressures than those developed by refrigerant monochloro-difluoromethane (R-22), one can substitute monochloro-difluoromethane (R-142b) as illustrated in the data of Table 4.

If the same degree of flammability of difluoroethane (152a) of Table 1 is objectionable for safety reasons, it may be mixed with the non-flammable dichloro-difluoromethane (R-12) to eliminate flammability, or refrigerant R-115 as tabulated in Table 7 may well be used. Pressure data were taken with a mixture 26.2 wt% R-152a and 73.8 wt% R-12, which mixed refrigerant is commonly designated as refrigerant R-500. The following Table 5 shows observed vapor pressures of a solution of 54.5 wt % R-500 in n-propanol. This data discloses temperature and/or vapor pressure potential difference amplification as the temperature is increased. The Table 6 shows comparable pressure versus temperature data for R-12 dissolved in n-propanol.

TABLE 5

Vapor Pressure of 54.5 wt percent R-500 Dissolved in n-propanol Compared With Published Vapor Pressures of R-500.

| Temp. Deg. F. | Specific Vol. of Vap. cf/lb. | Vap. Press. R-500 Psia | Vap. Press. Psia 54.5 wt % R-500 in n-propanol |
|---|---|---|---|
| 40 | .8017 | 60.8 | 47.6 |
| 50 | .6774 | 72.4 | 55.7 |
| 90 | .3626 | 135.86 | 98.0 |
| 120 | .2349 | 204.99 | 140.6 |
| 140 | .1769 | 263.5 | 174.2 |

TABLE 6

Vapor Pressures of Dichloro-difluoromethane (R-12) Dissolved in n-Propanol, Showing Amplification of Vapor Pressure Potential Difference with Pure R-12.

| Temp. Deg. F. | Vapor Spec. Vol. v | R-12 Vap. Press. Psia | Vap. Press. 59 wt % R-12/ n-propanol | Vap. Press. 71 wt % R-12/ n-propanol |
|---|---|---|---|---|
| 40 | .773 | 51.67 | 43.0 | 46.6 |
| 50 | .655 | 61.39 | 50.6 | 54.6 |
| 60 | .558 | 72.43 | 59.4 | 64.6 |
| 70 | .478 | 84.89 | 68.6 | 75.2 |
| 80 | .411 | 98.9 | 79.6 | 86.6 |
| 90 | .355 | 114.5 | 89.6 | 100.6 |
| 100 | .308 | 131.8 | 103.6 | 114.0 |
| 110 | .268 | 151.1 | 101.0 | 130.0 |
| 120 | .233 | 172.3 | 132.6 | 146.2 |
| 130 | .203 | 195.7 | 147.6 | 165.6 |

TABLE 7

Vapor Pressures of Monochloro-pentafluoro-ethane Dissolved in n-Propanol.

| Temp. Deg. F. | Vap. Press. Psia R-115 | Vap. Press. 50 wt % R-115/ n-propanol | Vap. Press. 33 wt % R-115/ n-propanol |
|---|---|---|---|
| 40 | 73.65 | 72.2 | 68.2 |
| 50 | 87.01 | 85.0 | 77.5 |
| 60 | 102.1 | 98.6 | 87.6 |
| 80 | 138.1 | 128.6 | 113.6 |
| 90 | 159.2 | 145.6 | 127.6 |
| 100 | 182.7 | 165.7 | 141.6 |
| 110 | 208.7 | 184.6 | 157.5 |
| 120 | 237.3 | 198.6 | 173.6 |
| 130 | 268.7 | 217.1 | 188.0 |

This invention is thus a three fold cooperation of: (a) Suitable solute and solvent of widely differing boiling points exhibiting large temperature sensitive divergence from Raoult's Principle as shown by difference in slope of the vapor pressure curves of respective solute and solution; (b) Suitable cycles to provide useful heat transfer or power output from amplified temperature and/or vapor pressure potential difference at the higher operating temperatures resulting from greater divergence from Raoult's Principle at lower temperatures; and (c) Suitable mechanical systems to bring about the required cycles of temperature and pressure changes of the working fluids to thereby deliver amplified useful heat transfer or equivalent power output at the higher temperature.

Referring to FIG. 1, the two rectangular enclosures in the lower portion represent the complete cycle of operation of R-152a vapor from n-propanol solution of Table 1 when plotting enthalpy change, $H_v$, of R-152a according to the vertical scale on the right. The circled numbers represent phases of the cycle of operation which will be discussed. Phase 1 represents evaporation of a pound of refrigerant solute from the solution at a low temperature, in this example 40 Deg. F., 500 Deg. R. Heat of vaporization, $H_v$, which is the enthalpy change for a pound of vapor, is plotted by the height of the rectangle as indicated on the vertical scale. A horizontal line, from the 40 Deg. F. point on the above curve for the vapor pressure of the solution, intercepts the vapor pressure curve for R-152a at the condensing temperature of 37 Deg. F. in this illustration. The temperature difference Delta t equals 3 Deg. Phase 2, that of condensation of pure solute, takes place at the temperature of 37 Deg. F. and in the process releases heat of vaporization, 129.7 Btu/pound. The solute is then raised in temperature to 115 Deg. F. (575 Deg. R.) by passing through a counter-flow heat exchanger. Phase 3 consists of evaporation of pure solute at this higher temperature with absorption of 110.5 Btu of heat. A horizontal line from the 115 Deg. F. point on the above curve of vapor pressure for pure solvent, intercepts the curve of vapor pressure for solution at 130 Deg. F. This is the temperature limit at which solution can absorb vapor at the corresponding pressure of 156 Psia. The temperature difference of this horizontal line Delta t is 15 Deg. F. Note the amplification of 3 Deg. to 15 Deg. The solution in this example has been raised to a temperature of 130 Deg. F. by a counter flow heat exchanger. Phase 4 consists of absorbing the solute vapor and liberating the heat of absorption, 111 Btu per pound. Finally, the temperature of the diluted solution is brought back to the original 40 Deg. F. by the counter flow heat exchanger.

The potential energy, P.E., that can be converted to useful work is determined by dividing the area of each phase rectangle by the temperature degrees R. It is seen that more energy can be converted to useful work by any engine cycle with phases differeing 15 Deg. F. between the boiler and the condenser or the equivalent absorber than by a cycle operating with temperature difference of but 3 Deg. F. between the evaporating and condensing phases. The potential for deriving useful work is thus seen to have been amplified by changing the cycle from the low temperature range to the higher temperature range and by reversing its order of phases to thus make a complete cycle.

With each horizontal line Delta t connecting the two vapor pressure curves there is also a vertical line Delta p representing pressure difference between the two vapor pressure curves at that temperature.

To calculate the approximate value of the potential energy in foot pounds per pound to solute convertible to useful work in such a vapor process operating through cycles one and two, or three four, one can multiply Delta p* 144* (specific volume, v). To reduce this potential energy to Btu units, divide by 778 foot pounds per Btu. A more exact value involves the process of integration.

One can derive the pressure potential energy convertible to useful work in a cycle by plotting the area in which the pressure difference between the two fluids in pounds per square foot is represented on the verticle dimension and the specific volume of the vapor in cubic feet per pound is represented on the horizontal dimension. Of course the results must be reduced to Btu units if its numerical value is to be compared approximately equal to that of the previous thermal calculation. Thus the above plotted area must be divided by 778 ft. lbs./Btu. The above plotted area is referred to as an engine indicator diagram.

In all the FIGS. 2 through 6, arrows designate the direction of fluid flow. Specifically V designates vapor refrigerant solute, VD designates vaporized distillate, L designates liquid refrigerant solute, CS designates concentrated absorbent solution (a solution in which there may still be a greater proportion of solute than of solvent), and DS designates diluted solution in which there is a larger proportion of refrigerant solute than in the case of CS. W designates water or other heat exchange fluid supplied externally.

Referring to FIG. 2 there is shown a distillation system 20 which illustrates a teaching of this invention, and in which most of the thermal power for distillation is derived from heat flow at a low ambient temperature region including a low temperature separator 101. The distillation system 20 includes the low temperature separator 101 for separating a suitable low boiling point solute refrigerant from a diluted absorbent solution as received from a supply duct 102. The proper liquid level within the low temperature separator 101 is maintained with the aid of a liquid level control means 103. Low temperature heat, which would normally be useless in a state of the art distillation system, is supplied to the separator 101 from an ambient source by means of a heat exchanger 104 to thus maintain the separator 101 at a predetermined temperature. The concentrated and therefore activated absorbent solution, resulting from the evaporation of refrigerant solute, leaves the separaator 101 by means of a concentrated solution conduit 109 while the separated solute refrigerant vapor passes through a low temperature vapor conduit 110 to a low temperature condenser 113 where the refrigerant vapor is condensed back to a liquid, thus establishing a temperature and/or vapor pressure potential difference between the condensed solute and the concentrated solution remaining in the separator 101. Specifically this temperature and/or vapor pressure potential difference is nearly entirely temperature difference, as the pressure difference between the separator 101 and the condenser 113 is very small. A heat exchanger 114 for circulating cold water is provided as a heat sink as a means for maintaining the low temperature condenser 113 at a lower temperature than the temperature of the separator 101. The free energy involved in the separation of refrigerant solute from solution is now temperature potential (stored) energy in the distillation system 20. The heat released in condensing the refrigerant vapor is rejected to the low temperature environment by the heat exchanger 114, and the liquid refrigerant is removed from the condenser 113 through a liquid solute conduit 115 by means of gravity and a solute pump 116. Similarly, concentrated absorbent solution is removed from the separator 101 by means of gravity and a solution pump means 117, while diluted absorbent solution is admitted to the separator 101 by a flow regulating means 118, which may be combined with the pump means 117. The fluid conduits 102, 109 and 115 are in thermal contact in a counter-flow heat exchange means 120 for raising the temperature of the separated refrigerant solute and the remaining concentrated solution, thus amplifying the temperature and/or vapor pressure potential difference between the condensed solute and the remaining concentrated solution. The counter-flow heat exchange means 120 also includes a heat supply conduit 122 for providing a flow of externally heated water or other fluid to provide make up heat to replace any heat lost in the heat exchange means 120.

An experimental counter-flow heat exchanger such as 120, which was well insulated on the outside and which enclosed ⅜ inch diameter conduits 20 feet long, gave satisfactory heat exchange.

The solute conduit 115, carrying liquid refrigerant, terminates at a high temperature solute boiler 124 including a liquid level control means 126, and a residue purging means 127 for correcting any accumulation of high boiling point solvent in the solute boiler 124, and a boiler heat exchanger 128 which is in thermal association with the boiler 124 and which can supply additional make up heat from a suitable external source to replace heat loss that might occur in the high temperature solute boiler 124, and thus provide means to maintain and stabilize a high temperature absorber 138 at a higher temperature than the separator 101. The components of the high temperature region including the solute boiler 124 and the absorber 138 should be well insulated.

A hot vapor solute conduit 134 provides a passage means from the solute boiler 124 to the absorber 138 which receives heated concentrated absorbent solution from the conduit 109 through a distributor means 139. In the embodiment of FIG. 2, the means for recovering the amplified temperature and/or vapor pressure potential difference (in this case amplified temperature difference) generated between the absorber 138 and the boiler 124 includes a distillation boiler 140, which is disposed in thermal association with the absorber 138 for distilling a fluid mixture which is delivered through a liquid inlet 142, and the residue of which leaves through a liquid outlet 143. There is a vapor conduit 144 provided to carry distilled vapor and its heat content from the distillation boiler 140 to a distillation condenser 145 disposed within and thermally associated with the solute boiler 124 for condensing the desired distillate and for transmitting the released heat of condensation to the refrigerant solute within the boiler 124. The distillation condenser 145 is also included in this recovery means. The desired distillate is recovered from the distillation condenser 145 through a distillate discharge means 146. In practice, the vapor solute conduit 134 may enter the absorber 138 at the bottom, thus allowing solute vapor to bubble through the absorbent solution within the absorber 138 to aid absorption. In this case the distributor means 139 is not required at the terminal end of the conduit 109. The counter-flow heat exchanger 120 also provides means for cooling diluted solution leaving the absorber 138 to near the temperature of the separator 101 to which it is returning.

The operation of this system 20 is as follows: Dilute solution of a low boiling point solute, such as a refrigerant, in a high boiling point solvent (such as tabulated in Tables 1 through 5) enters the low temperature separator 101 by means of the supply conduit 102 to fill the separator 101 to a level determined by the liquid level control means 103. By dilute solution is meant a solution with a relatively large percent of refrigerant solute. Low temperature heat for maintaining the separator 101 at a predetermined low temperature and for evaporating solute from solution within the separator 101 is supplied by available cold water flowing through the heat exchanger 104. Vapor produced in the separator 101 passes through the low temperature vapor conduit 110 into the low temperature condenser 113 where it is condensed to a liquid. The condenser 113 is maintained at a temperature lower than the temperature in the separator 101 by colder water flowing through the heat exchanger 114. Cold dilute absorbent solution is delivered to the separator 101 through the flow regulator 118. The concentrated absorbent solution is pumped out of the separator 101 through the conduit 109 by the solution pump means 117 assisted by gravity, while the cold condensed solute is pumped from the condenser 113 through the conduit 115 by the solution pump means 116 assisted by gravity. Both fluids are heated in the counter-flow heat exchanger 120 by warm diluted solution returning in the reverse direction through the conduit 102 of the heat exchanger 120 thus cooling the diluted solution and amplifying the temperature and/or vapor pressure potential difference between the heated fluids. Any additionally needed heat is supplied by warm water, such as geothermal water, also flowing in the reverse direction through the external heat supply conduit 122.

Heated solute from the conduit 115 enters the solute boiler 124 to maintain it at a level as determined by the liquid level control means 126, and the make up heat needed from an external source to maintain and stabilize the absorber 138 at a higher temperature than the separator 101 is added to the solute boiler 124 by the heat exchanger 120, and evaporation of solute takes place in the solute boiler 124. Most of the heat for evaporation of the solute within the boiler 124 is supplied by the condensation of distillate taking place in the distillation condenser 145.

The vaporized solute passes from the solute boiler 124 through the conduit 134 and into the absorber 138 where it is absorbed into the concentrated solution flowing over the surface of the distillation boiler 140, and the resulting heat of condensation and absorption is transmitted to the liquid within the distillation boiler 140. In other words, the distillation boiler 140 is thermally associated with the absorber 138 for recovering the heat of absorption from the absorber 138. The distillation boiler 140 is serviced with fresh liquid by the liquid inlet 142 and the residue is removed through the outlet 143. Vapor produced in the distillation boiler 140 passes through the vapor conduit 144 into the distillation condenser 145, carrying its heat of vaporization with it. As this vapor is condensed in the distillation condenser 145 its heat of vaporization is transmitted back to the liquid in the solute boiler 124. Condensed distillate is recovered through the recovery means 146. The useful thermodynamic service performed is distillation of valuable liquid into the distillation condenser 145 at a suitably elevated temperature, preferably at the boiling point of the liquid being distilled. In other words, the distillation boiler 140 and the distillation condenser 145 with connecting conduit 144 are the means for recovering the amplified temperature difference between the fluids in the absorber 138 and the high temperature boiler 124.

Referring to FIG. 3 there is shown a distillation system 150 illustrating another teaching of this invention in which energy for distillation is supplied from a mechanical source in the process of separating solute refrigerant from a suitable absorbent solution at a low temperature, thus establishing a temperature and/or vapor pressure potential difference between the condensed solute and the remaining concentrated solution in a separator 151 at the low temperature region. Then the temperature is raised for both the separated solute and the remaining concentrated solution, thus amplifying the temperature and/or vapor pressure potential difference between the condensed solute and the remaining concentrated solution, after which the temperature difference between the two separated fluids is used efficiently at a conveniently high temperature range for performing distillation of desired fluids. In this distillation system 150 mechanical energy is employed to separate solute from absorbent solution at a low temperature when there is insufficient temperature difference between fluids flowing through heat exchangers 104 and 114 for providing heat flow to accomplish separation of solute from solution.

Like components of FIGS. 2 and 3 have been given the same reference characters. The distillation system 150 includes the low temperature separator 151 (which is a modification of the separator 101 of FIG. 2) and which has a heat transfer surface 152 in thermal association or contact with a low temperature condenser 153 (also modified from the condenser 113 of FIG. 2). A power driven booster blower 154 with connecting conduit 110 provides means for transferring solute vapor from absorbent solution in the low temperature separator 151 and for condensing it in the low temperature condenser 153 to store temperature and/or pressure potential energy. The blower 154 maintains the temperature and pressure difference between the separator 151 and the condenser 153. Normally either heat exchanger 104 or 114 may be used to dissipate heat in order to provide means to maintain a predetermined low temperature in the separator 151. The heat exchanger 120 provides means for raising the temperature of the separated solute and remaining concentrated solution while simultaneously providing means for cooling diluted solution leaving the absorber 138.

Those like components of FIGS. 2 and 3 in the high temperature region provide the means for recovering the amplified temperature and/or vapor pressure potential difference between the heated solute and heated concentrated solution. The function of these high temperature components of the distillation system 150 of FIG. 3 is similar to the function of the similar components of system 20 of FIG. 2.

Referring to FIG. 4 there is illustrated another embodiment of this invention in which a system 155 produces mechanical power instead of distillation. Components that are common with those of FIGS. 2 and 3 have been given the same reference characters. The low temperature separator 101 and the low temperature condenser 113 with respective heat exchangers 104 and 114 function similarly to like components of FIG. 2 to provide means to separate solute from absorbent solution and thus establish a temperature and/or pressure potential difference between the condensed solute in the condenser 113 and the remaining solution in the separator 101. In the vapor conduit 110, which provides a vapor channel from the separator 101 to the low temperature condenser 113, there is also included a booster 154 similar to that of the distillation system 150 of FIG. 3 for mechanically aiding the separation of the two working fluids when a natural temperature difference between the heat exchangers 104 and 114 is not adequate to promote the transfer of refrigerant vapor for its separation. Heat exchanger 104, which can circulate cold water, provides means to thus maintain the low temperature separator 101 at a predetermined low temperature.

The heat exchanger 120 includes the same conduit passages 102, 109, 115, and 122 as those of systems 20 and 150. It also functions similarly to raise the temperature of separated solute and remaining concentrated solution, to thus amplify the temperature and/or vapor pressure potential difference between the condensed solute and the remaining concentrated solution. The working fluids used in system 155 of FIG. 4 are similar to fluids of systems 20 and 150.

The high temperature components and region of the power system 155 of FIG. 4 will now be described. The solute boiler 156 with a heat transfer surface 157 and with a liquid control means 158 is provided for receiving the heated solute refrigerant by means of the conduit 115. Also included is a residue purging means 159, an alternate boiler heat exchanger 160, and a hot vapor solute conduit 161. The alternate heat exchanger 160 which is in thermal associated with the boiler 156 provides alternate means for maintaining and stabilizing a high temperature absorber 162 at a higher temperature than the separator 101. The boiler 156 and heat transfer surface 157 are in thermal association with the absorber 162. The vapor conduit 161 directs solvent vapor to a power converter means 163 (such as a turbine or a positive displacement expander), which power converter means 163 exhausts solvent vapor through a conduit 164 into the absorber 162. The purpose of the power converter means 163 is to convert amplified vapor pressure potential energy into mechanical work. In other words, the power converter 163 is the means for recovering the amplified vapor pressure potential difference generated between the absorber 162 and the boiler 156. A heat exchanger 167 which is in thermal association with the absorber 162 is preferred to maintain and stabilize the temperature of the absorber 162 at a higher temperature than that of the separator 101.

The counter-flow heat exchanger 120 provides means for cooling diluted solution as it passes from the absorber 162 back to the separator 101.

The operation of the temperature pressure potential amplifier as the power system 155 of FIG. 4 is as follows: Dilute absorbent solution enters the low temperature separator 101 through the supply conduit 102, and concentrated absorbent solution leaves through the conduit 109. Proper liquid level is maintained in the low temperature separator 101 by the liquid control means 103. Heat is supplied to the separator 101 by cold water passing through the heat exchanger 104, which heat evaporates solute from the solution in the separator 101, and the resulting vapor, carrying heat of vaporization with it, passes through the conduit 110 and the blower 154 into the low temperature condenser 113 which is cooled by cold water flowing through the heat exchanger 114. The power driven blower 154 must be used as a booster if the water flowing through the exchanger 114 is not sufficiently colder than the water flowing through the heat exchanger 104. The separation of pure solute from absorbent solution provides storage of temperature and/or pressure potential energy. The concentrated absorbent solution remaining to be discharged from the separator 101 is pumped out through the conduit 109 by the pump means 117 which includes gravity aid, while condensed solute is pumped from the condenser 113 by the pump means 116 which includes gravity aid, and both liquids are heated to a higher temperature by passing through the counter-flow exchanger 120 where heat is absorbed from hot diluted absorbent solution counter flowing through the conduit 102 in the heat exchanger 120. Any required make up heat is supplied by naturally heated or stored hot water also counter flowing in the external heat supply conduit 122. As the solute liquid is heated in the conduit 115, and concentrated absorbent solution is heated in the conduit 109, the pressure potential energy is amplified due to the rapidly increasing vapor pressure difference between these two fluids.

Solute liquid is pumped into the boiler 156, while concentrated solution is delivered through a distributor 168 to form a solution film over the boiler heat transfer surface 157. The purging means 159 is provided to eliminate any contaminating solvent which might accumulate in the boiler 156. The make up heat delivered to the solute in the boiler 156 from an external source through the heat exchanger 160 helps evaporate solute in the boiler 156 and also maintains and stabilizes the high temperature absorber 162 at a higher temperature than the separator 101. Vapor solute carrying heat of vaporization is directed into the power converter 163 and is exhausted through the conduit 164 into the absorber 162 where it is absorbed into solution and the heat of absorption is transferred out of the absorber 162 by the heat transfer surface 157, thus reducing the back pressure within the absorber 162 and also providing heat for evaporation of the solute within the boiler 156. The solute vapor produced in the boiler 156 powers the power converter 163. The mechanical power delivered by the power converter 163 is the useful vapor pressure potential output of the system 155.

The temperature pressure potential amplifier system 170 of FIG. 5 is an embodiment of this invention for generating power and/or for heat pumping by means of vapor flow between and from components at temperatures that are below the temperature of the absorber 162, with the assistance of the power driven blower 154 and a compressor.

The components of the system 170 include a similar low temperature separator 101 and low temperature condenser 113 with corresponding vapor conduit 110 and vapor blower 154 as the system 155 of FIG. 4 to provide means to separate solute refrigerant from absorbent solution, to thus establish a temperature and/or vapor pressure potential difference between the condensed solute and the remaining concentrated solution in the separator 101. But in addition to these similar components there is a series of heat pump components including an ambient temperature boiler means 171, a heat exchanger 172 thermally associated with the low temperature separator 101 and the boiler means 171, a liquid refrigerant supply conduit 173, a liquid level control means 174, and a power driven vapor compressor 175 receiving vaporized solute from the ambient temperature boiler 171 and delivering the vapor to the absorber 162. The heat exchanger 172 functions to maintain the low temperature separator 101 and the ambient temperature boiler 171 at predetermined temperatures. The heat pump assembly including the power driven refrigerant compressor 175 is thermally associated with the ambient temperature boiler 171 and with the absorber 162, to thus transfer heat to the absorber 162 to maintain the temperature of the absorber at a usefully higher temperature than the temperature of the separator 101.

A counter-flow exchanger 176 having but three conduit passages 102, 109, and 115 replaces the heat exchanger 120 of FIGS. 2, 3, and 4. The heat exchanger 176 raises the temperature of the remaining concentrated solution within the separator 101 and a portion of the condensed solute, thus amplifying the temperature and/or vapor pressure potential difference between such condensed solute and such remaining portion of the concentrated solution. The counter-flow heat exchanger 176 also provides means for cooling diluted solution returning from the absorber 162 to the separator 101.

The operation of the system 170 of FIG. 5 for generating power is the same as the operation of the system 155 of FIG. 4 except that in the system 170 the high temperature make up heat is supplied to the absorber 162 by a heat pump assembly and the cycle of which also exhibits temperature and pressure potential amplification. The system 170 of FIG. 5 operates as follows when generating power: Some condensed solute is delivered from the low temperature condenser 113 to the ambient temperature boiler 171 through the liquid refrigerant conduit 173 to maintain a suitable liquid level in the boiler 171 as regulated by the liquid level control means 174. External ambient heat is supplied to the ambient temperature boiler 171 by means of the heat exchanger 172 at a temperature that may be so much lower than the temperature of the absorber 162 that the power driven vapor compressor 175 must add pressure to that of the vapor leaving the ambient temperature boiler 171 to deliver such vapor and its contained latent heat to the absorber 162. However, the vapor pressure of absorbent solution is less than that of pure solute at the same temperature. The pressure reduction within the absorber 162 increases the efficiency of the compressor 175 and reduces the power which must be expended by the compressor 175 to provide the required compression ratio for heat pumping,. Besides, the heat necessary for power conversion which must be supplied by the vapor delivered by means of the heat pump compressor 175 is but a small fraction of the total heat delivered to the solute boiler 156. Heat is also recycled to the solute boiler 156 from the absorber 162 through the heat exchange surface 157.

In case heat is to be delivered from the absorber 162 to external loads through the heat exchanger 167 in addition to generating power in the power converter 163, additional power is needed to drive the heat pump compressor 175 unless the temperature difference between the separator 101 and the absorber 162 is sufficiently small to eliminate the vapor pressure difference. This vapor pressure difference can also be reduced by reducing solute percentage in the absorbent solution (see underlined data of Table 3).

For a self acting heat pump delivering useful heat through the heat exchanger 167 for space heating, the temperature in the condenser 113 must be maintained sufficiently low that the vapor pressure in the condenser 113 is lower than the vapor pressure of concentrated solution in the separator 101. Thus, for example, if the temperature in the separator 101 is maintained at 50 Deg. F. corresponding to available ground water circulating through the heat exchanger 172, and the temperature in the condenser 113 is at 24 Deg. F. or lower corresponding to the heat exchanger 114 and winter air temperature, solute vapor leaving the separator 101 charged with 50 wt.% R-22 in n-propanol solution has sufficient pressure to drive vapor into the low temperature condenser 113 for condensation. (Refer to underlined data in Table 3). Also refrigerant evaporated at 50 Deg. F. from the ambient temperature boiler 171 is at sufficient pressure that it can be absorbed in the higher temperature absorber 162 at 82 Deg. F. to thereby deliver useful heat for space heating through the heat exchanger 67. (Refer to Table 3). Under these natural conditions heat pumping may be self sustained with little necessity for supplying external power to either the vapor compressor 175 or to the booster blower 154. Temperature pressure amplification is demonstrated here, since the difference in temperature represented by 82 Deg. F. minus 50 Deg. F. of the heat pump cycle to the absorber 162 is greater than the temperature difference 50 Deg. F. minus 24 Deg. F. of the low temperature separation cycle between the separator 101 and the condensor 113. For a higher temperature heat output at the heat exchanger 167, power must be added to the vapor compressor 175. This may be done by driving the compressor 175 with power delivered from the power converter 163. Both the power converter 163 and the vapor compressor 175 may be replaced, if desired, by a single turbocompressor (not shown).

With 50 wt.% R-22 in n-propanol is absorbent solution in the absorber 162, even if the absorber 162 is at a temperature of 100 Deg. F. and the ambient temperature boiler 171 with R-22 is at 50 Deg. F., the compression ratio required by the compressor 175 to deliver vapor to the absorber 162 is only 1.25. A state of the art heat pump system using R-22 refrigerant would require a compression ratio of 2.13 for the same temperatures 50 Deg. F. and 100 Deg. F. within the evaporator and the condenser, and the compressor would require more than three times as much power.

When the function of the system 170 of FIG. 5 is that of only heat pumping by use of an outside power source, the boiler 156 and power converter 163 with the associated components 115, 157, 158, 159, and 161 can be omitted. In this case all of the refrigerant solute liquid leaving the low temperature condenser 113 is pumped into the ambient temperature boiler 171, and the vaporized solute leaving the boiler 171 is supplied to the absorber 162 by the power driven vapor compressor 175, and the heat of absorption released at the absorber 162 is delivered as useful heat by the heat exchanger 167 to space to be heated. The counter-flow heat exchanger 176 is still the means for raising the temperature of the concentrated absorbent solution, thus amplifying the temperature difference between the condensed solute and the concentrated solution. Also the means for recovering the amplified temperature and/or vapor pressure potential difference (specifically the amplified temperature difference) generated between the ambient temperature boiler 171 and the absorber 162 includes the heat exchanger 167. The vapor compressor 175 aids in providing the means for maintaining the absorber 162 at a higher temperature than that of the separator 101 or ambient temperature boiler 171. The heat exchanger 172 which may circulate ambient temperature water is the heat supply means for maintaining and stabilizing the separator 101 and the ambient temperature boiler 171 at predetermined temperatures. The low temperature heat exchanger 114 serves as a heat sink which dissipates heat from the condenser 113 to still colder air, thus causing condensation of separated solute vapor in the condenser 113. The booster blower 154, which is externally powered, provides any additional vapor pressure needed to deliver solute vapor to the condenser 113, if the condenser 113 is not sufficiently colder than the separator 101.

When the function of the system 170 of FIG. 5 is to be primarily for power production, fluids such as R-152a and 55.5 wt.% R-152a in n-propanol solution as of Table 1 might be more suitable working fluids to use. The operating temperature in the absorber 162 should be as high as 120 Deg. F. or 140 Deg. F. The heat exchanger 172 provides means for maintaining the low temperature separator 101 and the boiler 171 at predetermined temperatures. If the temperature of the separator 101 is 40 Deg. F. for example, the condenser 113 needs to be at 35 Deg. F. to allow the required vapor flow from the low temperature separator 101 to the condenser 113 to thus provide separation of refrigerant solute from the absorbent solution. This temperature difference of 5 Deg. F. may be supplied by ocean water at different depths or from other common natural temperature differences. If this natural difference of temperature is not available, the power driven blower 154 can induce vapor to flow from the low temperature separator 101 to the condenser 113 and thus induce heat flow to recycle, through heat exchangers 114 and 172 if they are in common communication with a low temperature heat source, back to the low temperature separator 101. In this case, a small amount of power is required to drive the booster blower 154. (See Table 1.)

The heat pump circuit including the compressor 175 provides means for maintaining the high temperature absorber 162 at a temperature higher than that of the separator 101 and the ambient temperature boiler 171. Heat that is liberated by vapor absorbed in the absorber 162 at, for example 120 Deg. F., is transmitted back through the boiler transfer surface 157 into the boiler 156 in nearly sufficient quantity to produce all the solute vapor at the amplified pressure to drive the power converter 163. The potential energy in this process is some 3.0 Btu per pound. (See Table 1.) Make up heat for the 3.0 Btu converted to power plus any heat loss in the system is provided by the compressor 175 pumping a small quantity of solute vapor from the ambient temperature boiler 171 into the absorber 162. Additional solute vapor must be pumped by the compressor 175 from the ambient temperature boiler 171 to supply any heat delivered by the heat exchanger 167 to any external load.

The small hydraulic load of the pumps 116 and 117 can be reduced by mounting the counter-flow heat exchanger 176 in a vertical position as illustrated in the figures so that gravity provides part of the driving pressure.

System 180 of FIG. 6 is still another embodiment of the heat transfer teachings of this invention in which refrigeration and/or air conditioning or power production are desired when a cooling tower may be the only practical heat sink. Suitable working fluids are illustrated by data of Table 1.

The components of the low temperature region of system 180 are similar to those of system 150 of FIG. 3 and carry the same reference characters. Also like components of FIGS. 5 and 6 have been given the same reference characters. The low temperature separator 151 is supplied with dilute absorbent solution through the supply duct 102 and associated flow regulator 118. The low temperature separator 151 is in thermal communication with an external space that is to be refrigerated or air conditioned by means of the heat exchanger 104. The power driven blower 154 in the conduit 110 leaving the low temperature separator 151 functions to provide the flow of solute vapor from the low temperature separator 151 into the low temperature condenser 153 by which heat is recycled to the low temperature separator 151 through the heat transfer surface 152. By this process absorbent solution is concentrated in the separator 151 to thus establish a temperature and/or vapor pressure potential difference between the condensed solute and the remaining concentrated solution in the separator 151. The concentrated solution conduit 109 carries concentrated solution from the separator 151 through the counter-flow heat exchanger 176 to an absorber distributor 181 within an absorber 182, while the liquid solute conduit 115 carries liquid refrigerant solute through the counter-flow heat exchanger 176 to a solute boiler 183 to raise the temperature of the respective concentrated solution and the liquid solute to thus provide means to amplify the temperature and/or vapor pressure potential difference between the solution in the absorber 182 and the solution in the boiler 183. A heat exchanger 184 and air fin heat exchanger 185 are in heat transfer relationship with the boiler 183 to receive heat from a higher temperature source than exchanger 104, thus functioning to recover the amplified temperature and/or vapor pressure potential difference generated between the absorber 182 and the boiler 183. Diluted solution flows in the opposite direction through the conduit 102 in the heat exchanger 176, thus providing means for cooling the diluted solution flowing back from the absorber 182 to the low temperature separator 151.

The power converter means 163 can function to deliver power as in the system 155, but also can be driven by an external power source when extra pressure is required to drive solute vapor through the conduit 164 from the solute boiler 183 and thence into the absorber 182, where heat of absorption is rejected through the heat exchanger 187.

The heat pump means with vapor compressor 175, which is associated with the separator 151 and with the absorber 182, receives refrigerant solute vapor from the separator 151 and delivers it to the absorber 182 to thus deliver heat to the absorber 182 and at the same time provides means for maintaining the low temperature separator 151 ar a predetermined low temperature. The temperature of the absorber 182 is maintained at a higher temperature than that of the separator 151 by a heat exchanger 187 which is in thermal associated with the absorber 182 and which dissipates heat to an environment such as a cooling tower at a temperature a little lower than that of the absorber 182.

The operation of the system 180 of FIG. 6 for refrigeration and air conditioning is as follows: The vapor compressor 175 is driven to reduce the vapor pressure and thus the temperature in the low temperature separator 151, for example to predetermine 20 Deg. F., which would refrigerate a desired space by means of the heat exchanger 104. Additional refrigerant solute vapor is withdrawn from the low temperature separator 151 through the vapor conduit 110 with the assistance of the power driven blower 154, thus concentrating the remaining absorbent solution in the separator 151 and generating a temperature and/or vapor pressure potential difference between refrigerant solute and the remaining solution. This said portion of the refrigerant solute vapor is delivered to the condenser 153 at a pressure only sufficiently greater than the pressure in the low temperature separator 151 to be condensed and to maintain the temperature in the condenser 153 slightly above the temperature in the low temperature separator 151 to thus allow heat of vaporization to recycle from the condenser 153 back to the low temperature separator 151. (See Table 1). The blower 154 requires but a small amount of power because the vapor pressure difference is small. The concentrated solution from the separator 151 is then delivered by the pump means 117 through the counter-flow heat exchanger 176 where it is heated, while the liquid refrigerant solute is also delivered from the condenser 153 by the pump means 116 (assisted by gravity) through the counter-flow heat exchanger 176 where it is heated and is then delivered to the solute boiler 183. The temperature and/or vapor pressure potential difference is thus amplified in the heat exchanger 176.

The temperature of the absorber 182 receiving the concentrated and heated absorbent solution is stabilized at the higher temperature by an external heat sink such as a cooling tower through thermal communication with the heat exchanger 187. Absorption of refrigerant vapor takes place in the absorber 182 at this stabilized temperature, for example 80 Deg. F., if the vapor pressure is sufficiently low in the absorber 182 that vapor can be received from the solute boiler 183, which may be several degrees cooler, for example 70 Deg. F. (See Table 1). If a lower temperature such as 50 Deg. F. is desired in the solute boiler 183 to provide better air conditioning, power is supplied to drive the power converter means 163 to maintain a flow of solute vapor from the solute boiler 183 which is in thermal communication with the external space to be cooled or air conditioned by means of the heat exchanger 184 or the air fin exchanger 185. In this case all the heat for evaporation in the boiler 183 is supplied from the ambient space to be cooled. As absorbent solution becomes diluted in the absorber 182 it is returned through the conduit 102 and the flow regulator 118 and is cooled as it passes through the heat exchanger 176 to be returned to the low temperature separator 151.

The operation of the heat pump compressor 175 is controlled by a thermostat to maintain the desired refrigerating temperature in the low temperature separator 151.

The temperature pressure potential amplifier system 180 of FIG. 6 can function as a thermally powered air conditioner or as a power generator if the heat supplied to the solute boiler 183 by the heat exchanger 184 or 185 is at a sufficiently high temperature, for example at a temperature above that of the absorber 182, that the vapor pressure within the boiler 183 is greater than the back vapor pressure within the absorber 182. The power converter 163 as illustrated can thus function either as a power generator or as a vapor blower, depending on the relative temperature of the environment to which heat can be rejected by the heat exchanger 187 and the temperature of the boiler 183.

The operation of the system 180 of FIG. 6 for thermally powered air conditioning or for power production is as follows: The vapor compressor 175 is driven to reduce the vapor pressure and thus the temperature in the low temperature separator 151, for example to a predetermined 50 Deg. F., sufficiently low temperature to cool a space to be air conditioned by means of the heat exchanger 104. Additional refrigerant solute vapor is withdrawn from the low temperature separator 151 through the vapor conduit 110 by means of the power driven blower 154, thus concentrating the solution in the separator 151 so that the remaining concentrated solution contains a higher percent of high boiling point solvent. The said additional portion of solute vapor is delivered to the condenser 153 and is condensed to a liquid, thus establishing a temperature and/or vapor pressure potential difference between the solute and remaining concentrated solution. As before, the blower 154 requires but a small amount of power. Both the solute and the remaining concentrated solution are heated by passing through the heat exchanger 176, thus amplifying the temperature and/or vapor pressure potential difference between the solute and solution as they are delivered to the respective boiler 183 and absorber 182. The temperature of the absorber 182 is stabilized at a temperature (for example 80 Deg. F.) which is above the temperature of the separator 151 by thermal association of a heat sink such as a cooling tower by means of the heat exchanger 187. The boiler 183 may be supplied with higher temperature heat (for example 110 Deg. F.) from natural sources by means of the heat exchangers 184 or 185, thus maintaining a higher refrigerant vapor pressure in the boiler 183 than in the absorber 182. Under this condition of vapor pressure difference the power converter 163 delivers power, at least a portion of which can be used to drive the blower 154 and the heat pump compressor 175. Of course the temperature of the boiler 183 may be a little less than that of the absorber 182 so that it may receive heat directly from the absorber 182 by changing the heat exchanger 185 to function like the heat transfer surface 167 of the system 155 of FIG. 4 to provide the means to remove heat from the absorber 182.

It is to be understood that in the above descriptions the terms low temperature and high temperature are only relative. Also the specific examples of working fluids are only representative, and other concentrations and other combinations of solute and solvent with similar representative solubility properties can be used in the various systems described.

It is further to be understood that one skilled in the art can combine the circulating pumps 115 and 117 with the flow regulator 118, although they are separately illustrated. Although these pumps are illustrated as gear pumps, other types of pumps may be used.

It is to be further understood that heat exchange means including two or three heat exchangers (not shown) can be substituted for the counter-flow heat exchanger shown in each of the embodiments, one heat exchanger for instance could be used for raising the temperature of the concentrated solution, another for raising the temperature of the condensed solute and a third heat exchanger for cooling the diluted solution returning from the absorber to the separator means. However, the cooling of the diluted solution may be accomplished by one of the first two heat exchangers (not shown).

The temperature pressure potential amplifier systems described herein have certain advantages which are as follows:

Heat transfer between a low temperature heat source and a low temperature heat sink can produce useful heat flow at a higher temperature region such as between a distillate boiler and a distillate condenser for efficient distillation, using low grade heat.

Heat transfer between a low temperature heat source and a lower temperature heat sink can by the teachings of this invention transfer heat from one temperature level (such as ambient temperature) to a higher temperature region, a process called heat pumping.

Power can be produced efficiently by means of heat transfer from an ambient temperature heat source to a lower temperature heat sink.

By the teachings of this invention power, air conditioning and refrigeration can be produced efficiently from renewable heat sources that do not involve combustion products or other products which might degrade the environment.

The teachings of this invention can provide heat pumps which would require less power input, especially during cold weather.

The teachings of this invention can provide air conditioning with more efficient use of supplied power.

The systems described in this invention can be carried out efficiently in small sized plants as well as in large ones, thus modular power units built according to the teachings of this invention could be placed in service with relatively short construction time.

I claim as my invention:

1. An absorption type heat transfer system employing as working fluids a low temperature boiling point stable refrigerant as solute and a stable solvent of high boiling point, with a solution of the solute and solvent functioning as an absorbent, in which the mutual solubility of the working fluids is much greater at high temperatures than at low temperatures as indicated by the slope of the log vapor pressure versus temperature curve of the solution of solute and solvent being less than the slope of the log vapor pressure versus temperature curve of the pure solute, the system comprising: a condenser; separator means operating at a predetermined temperature for evaporating a portion of the solute to a vapor and for separating such portion of the solute from a solution of the working fluids; means for maintaining said separator means at the predetermined temperature; means for delivering the separated solute vapor to said condenser for condensing the solute vapor to a liquid, leaving within said separator means a remaining concentrated solution of the working fluids, thus establishing a temperature and/or vapor pressure potential difference between the condensed solute and the remaining concentrated solution of the working fluids; heat exchange means for raising the temperature of the said remaining concentrated solution, thus amplifying the temperature and/or vapor pressure potential difference between the condensed solute and said remaining concentrated solution; boiler means disposed for receiving and evaporating condensed solute; an absorber disposed for receiving the heated remaining concentrated solution and for absorbing the solute vapor from said boiler means into solution and thereby releasing heat of absorption and diluting the solution; means for maintaining said absorber at a higher temperature than said separator means; means for recovering the amplified temperature and/or vapor pressure potential difference generated between said absorber and said boiler means; and means for returning the diluted solution within said absorber through said heat exchange means to said separator means thus cooling such diluted solution before returning to said separator means.

2. An absorption type heat transfer system as defined in claim 1 wherein said means for delivering the separated solute to said condenser includes a power driven blower.

3. An absorption type heat transfer system as defined in claim 1 wherein said heat exchange means for raising the temperature of said remaining solution includes a counter-flow heat exchanger, and said means for returning the diluted solution within said absorber to said separator means also includes said counter-flow heat exchanger.

4. An absorption type heat transfer system as defined in claim 3 wherein said counter-flow heat exchanger includes a heat supply conduit to provide make-up heat.

5. An absorption type heat transfer system employing as working fluids a low temperature boiling point stable refrigerant as solute and a stable solvent of high boiling point, with a solution of the solute and solvent functioning as an absorbent, in which the mutual solubility of the working fluids is much greater at high temperatures than at low temperatures as indicated by the slope of the log vapor pressure versus temperature curve of the solution of solute and solvent being less than the slope of the log vapor pressure versus temperature curve of the solute, comprising: a condenser; separator means operating at a predetermined temperature for evaporating a portion of the solute to a vapor and for separating a portion of the solute from a solution of the working fluids; means for maintaining said separator means at the predetermined temperature; means for delivering the separated solute vapor to said condenser for condensing the solute to a liquid, leaving in said separator means a remaining concentrated solution of the working fluids, thus establishing a temperature and/or vapor pressure potential difference between the condensed solute and the remaining concentrated solution of the working fluids; heat exchange means for raising the temperature of the condensed solute and said remaining concentrated solution, thus amplifying the temperature and/or vapor pressure potential difference between the condensed solute and said remaining concentrated solution; boiler means disposed for receiving and evaporating the heated solute; an absorber disposed for receiving the heated remaining concentrated solution and for absorbing the solute vapor from said boiler means into solution thereby releasing heat of absorption and diluting the solution; a distillation boiler for receiving a mixed liquid, the distillation boiler being thermally associated with said absorber for receiving and removing the heat of absorption from said absorber; a distillation condenser thermally associated with said boiler means; means for transferring vapor from said distillation boiler to said distillation condenser to thus condense such vapor to a liquid distillate and transfer the heat of vaporization of such distillate to said boiler means; means for maintaining said absorber at a higher temperature than said separator means; and means for returning the diluted solution within said absorber through said heat exchange means to said separator means for thus cooling such diluted solution before returning to said separator means.

6. An absorption type heat transfer system as defined in claim 5 wherein said means for delivering the separated solute vapor to said condenser includes a power driven blower.

7. An absorption type heat transfer system as defined in claim 5 wherein said heat exchange means for raising the temperature of the condensed solute and said remaining solution includes a counter-flow heat exchanger and said means for returning the diluted solution within said absorber to said separator means also includes said counter-flow heat exchanger.

8. An absorption type heat transfer system as defined in claim 7 wherein said counter-flow heat exchanger includes a heat supply conduit to provide make up heat.

9. An absorption type heat transfer system employing as working fluids a low temperature boiling point stable refrigerant as solute and a stable solvent of high boiling point, with a solution of the solute and solvent functioning as an absorbent, in which the mutual solubility of the working fluids is much greater at high temperatures than at low temperatures as indicated by the slope of the log vapor pressure versus temperature curve of the solution of solute and solvent being less than the slope of the log vapor pressure versus temperature curve of the solute, comprising: a condenser; separator means operating at a predetermined temperature for evaporating a portion of the solute to a vapor and for separating a portion of the solute from a solution of the working fluids; means for maintaining said separator means at the predetermined temperature; means for delivering the separated solute vapor to said condenser for condensing the solute vapor to a liquid, leaving in said separator means a remaining concentrated solution of the working fluids, thus establishing a vapor pressure potential difference between the condensed solute and the remaining concentrated solution of the working fluids; heat exchange means for raising the temperature of the condensed solute and said remaining concentrated solution, thus amplifying the vapor pressure potential difference between the condensed solute and said remaining concentrated solution; boiler means disposed for receiving and evaporating the heated solute; an absorber for receiving the heated remaining concentrated solution; a power converter for recovering the amplified vapor pressure potential difference generated between said absorber and said boiler means; and means for conducting the solute vapor from said boiler means through said power converter and into said absorber wherein the solute vapor is absorbed into solution to thereby release heat of absorption and dilute the solution; means for maintaining said absorber at a higher temperature than said separator means; and means for returning the diluted solution within said absorber through said heat exchange means to said separator means thus cooling such diluted solution before returning to said separator means.

10. An absorption type heat transfer system as defined in claim 9 wherein said means for delivering the separated solute vapor to said condenser includes a power driven blower.

11. An absorption type heat transfer system as defined in claim 9 wherein said heat exchange means for raising the temperature of the separated and condensed solute, and said remaining solution, includes a counter-flow heat exchanger, and said means for returning the diluted solution within said absorber to said separator means also includes said counter-flow heat exchanger.

12. An absorption type heat transfer system as defined in claim 11 wherein said counter-flow heat exchanger includes a heat supply conduit to provide make up heat.

13. An absorption type heat transfer system employing as working fluids a low temperature boiling point stable refrigerant as solute and a stable solvent of high boiling point, with a solution of the solute and solvent functioning as an absorbent, in which the mutual solubility of the working fluids is much greater at high temperatures than at low temperatures as indicated by the slope of the log vapor pressure versus temperature curve of the solution of solute and solvent being less than the slope of the log vapor pressure versus temperature curve of the solute, comprising: a condenser; separator means operating at a predetermined temperature for evaporating a portion of the solute to a vapor and for separating such portion of the solute from a solution of the working fluids; means for maintaining said separator means at the predetermined temperature; means for delivering the separated solute vapor to said condenser for condensing the solute vapor to a liquid, leaving in said separator means a remaining concentrated solution of the working fluids, thus establishing a temperature and/or vapor pressure potential difference between the condensed solute and the remaining concentrated solution of the working fluids; heat exchange means for raising the temperature of said remaining concentrated solution, thus amplifying the temperature and/or vapor pressure potential difference between the condensed solute and said remaining concentrated solution; boiler means disposed for receiving and evaporating the condensed solute; an absorber disposed in thermal association with said boiler means for receiving the heated remaining concentrated solution and for absorbing the solute vapor from said boiler means into solution thereby releasing heat of absorption and diluting the solution; means for recovering the amplified temperature and/or vapor pressure potential difference generated between said absorber and said boiler means; heat pump means associated with said boiler means and with said absorber to maintain said absorber at a higher temperature than said separator means; and means for returning the diluted solution within said absorber through said heat exchanger means to said separator means for thus cooling such diluted solution before returning to said separator means.

14. An absorption type heat transfer system as defined in claim 13 wherein said heat exchange means for raising the temperature of said remaining solution includes a counter-flow heat exchanger and said means for returning the diluted solution within said absorber to said separator means also includes said counter-flow heat exchanger.

15. An absorption type heat transfer system as defined in claim 13 wherein said means for delivering the separated solute vapor to said condenser includes a power driven blower.

16. An absorption type heat transfer system as defined in claim 13 wherein means for recovering the amplified temperature and/or vapor pressure potential difference between said absorber and said boiler means includes a power converter.

17. An absorption type heat transfer system as defined in claim 13 wherein said means for recovering the amplified temperature and/or vapor pressure potential difference between said absorber and said boiler means includes a heat exchanger in heat transfer relationship with said absorber.

18. An absorption type heat transfer system employing as working fluids a low temperature boiling point stable refrigerant as solute and a stable solvent of high boiling point, with a solution of the solute and solvent functioning as an absorbent, in which the mutual solubility of the working fluids is much greater at high temperatures than at low temperatures as indicated by the slope of the log vapor pressure versus temperature curve of the solution of solute and solvent being less than the slope of the log vapor pressure versus temperature curve of the solute, comprising: a condenser; separator means operating at a predetermined temperature for evaporating a portion of the solute to a vapor and for separating a portion of the solute from a solution of the working fluids; means for maintaining said separator means at the predetermined temperature; means for delivering the separated solute vapor to said condenser for condensing the solute vapor to a liquid, leaving in said separator means a remaining concentrated solution of the working fluids and thus establishing a temperature and/or vapor pressure potential difference between the condensed solute and the remaining concentrated solution of the working fluids; an ambient temperature boiler disposed for receiving a portion of the condensed solute from said condenser; heat exchange means for raising the temperature of said remaining concentrated solution and the remaining portion of the condensed solute, thus amplifying the temperature and/or vapor pressure potential difference between said remaining concentrated solution and said remaining portion of the condensed solute; another boiler disposed for receiving and evaporating the heated remaining portion of the condensed solute; and absorber disposed in thermal association with said another boiler for receiving the heated remaining concentrated solution and for absorbing the solute vapor from said another boiler into solution thereby releasing heat of absorption and diluting the solution; means for recovering the amplified temperature and/or vapor pressure potential difference generated between said absorber and said another boiler; heat pump means associated with said ambient temperature boiler and with said absorber to maintain said absorber at a higher temperature than said separator means; and means for returning the diluted solution within said absorber through said heat exchange means to said separator means, thus cooling such solution before returning to said separator means.

19. An absorption type heat transfer system as defined in claim 18 wherein said means for delivering the separated solute vapor to said condenser includes a power driven blower.

20. An absorption type heat transfer system as defined in claim 18 wherein said means for recovering the amplified temperature and/or pressure potential difference between said absorber and said another boiler means includes a power converter.

21. An absorption type heat transfer system employing as working fluids a low temperature boiling point stable refrigerant as solute and a stable solvent of high boiling point, with a solution of the solute and solvent functioning as an absorbent, in which the mutual solubility of the working fluids is much greater at high temperatures than at low temperatures as indicated by the slope of the log vapor pressure versus temperature curve of the solution of solute and solvent being less than the slope of the log vapor pressure versus temperature curve of the solute, comprising: a condenser; separator means operating at a predetermined ambient temperature for evaporating a portion of the solute to a vapor and for separating a portion of the solute from a solution of the working fluids; means for maintaining said separator means at the predetermined ambient temperature; means for delivering the separated solute vapor to said condenser for condensing the solute to a liquid, leaving in said separator means a remaining concentrated solution of the working fluids, and thus establishing a temperature and/or vapor pressure potential difference between the condensed solute and the remaining concentrated solution of the working fluids; an ambient temperature boiler disposed for receiving a portion of the condensed solute from said condenser; heat exchange means for raising the temperature of said remaining concentrated solution and the remaining portion of the condensed solute, thus amplifying the temperature and/or vapor pressure potential difference between said remaining concentrated solution and said remaining portion of the condensed solute; another boiler disposed for receiving and evaporating the heated remaining portion of the condensed solute; an absorber disposed in thermal association with said another boiler for receiving the heated remaining concentrated solution and for absorbing the solute from said another boiler into solution thereby releasing heat of absorption while diluting the solution; a heat exchanger in thermal association with said absorber for recovering the amplified temperature and/or vapor pressure potential difference between said ambient temperature boiler and said absorber; heat pump means associated with said ambient temperature boiler and with said absorber to maintain said absorber at a higher temperature than said separator means; and means for returning the diluted solution within said absorber through said heat exchange means to said separator means thus cooling such diluted solution before returning to said separator means.

22. An absorption type heat transfer system employing as working fluids a low temperature boiling point stable refrigerant as solute and a stable solvent of high boiling point, with a solution of the solute and solvent functioning as an absorbent, in which the mutual solubility of the working fluids is much greater at high temperatures than at low temperatures as indicated by the slope of the log vapor pressure versus temperature curve of the solution of solute and solvent being less than the slope of the log vapor pressure versus temperature curve of the solute, comprising: a condenser; separating means operating at a predetermined temperature for evaporating a portion of the solute to a vapor and for separating a portion of the solute from a solution of the working fluids; means including a power driven blower for delivering the separated solute vapor to said condenser for condensing the solute vapor to a liquid, leaving in said separator means a remaining concentrated solution of the working fluids, and thus establishing a temperature and/or vapor pressure potential difference between the condensed solute and the remaining concentrated solution of the working fluids; heat exchange means for raising the temperature of the condensed solute and said remaining concentrated solution, thus amplifying the temperature and/or vapor pressure potential difference between the condensed solute and said remaining concentrated solution; boiler means disposed for receiving and evaporating the heated condensed solute; an absorber for receiving the heated concentrated solution and for absorbing the solute vapor from said boiler means into solution thereby releasing heat of absorption while diluting the solution; means for removing the heat of absorption from said absorber to thus maintain said absorber at a higher temperature than said separator means; means for recovering the amplified temperature and/or vapor pressure potential difference generated between said absorber and said boiler means; heat pump means in association with said separator means and with said absorber to cause the flow of solute vapor from said separator means to said absorber to thus maintain said separator means at the predetermined temperature; and means for cooling and returning the diluted solution within said absorber through said heat exchange means to said separator means before returning to said separator means.

23. An absorption type heat transfer system as defined in claim 22 wherein the means for recovering the amplified temperature and/or vapor pressure potential difference between said absorber and said boiler means includes a power converter.

24. An absorption type heat transfer system as defined in claim 22 wherein the means for recovering the amplified temperature and/or vapor pressure potential difference between said absorber and said boiler means includes a power driven power converter for aiding the flow of solute vapor from said boiler means to said absorber.

25. An absorption type heat transfer system as defined in claim 22 wherein the means for recovering the amplified temperature and/or vapor pressure potential difference between said absorber and said boiler means includes heat transfer means in association with said boiler means.

26. An absorption type heat transfer system as defined in claim 22 wherein a heat exchanger is disposed in thermal association with said separator means for providing refrigeration.

* * * * *